(12) United States Patent
Watanabe

(10) Patent No.: US 8,619,210 B2
(45) Date of Patent: Dec. 31, 2013

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 498 days.

(21) Appl. No.: 13/056,191

(22) PCT Filed: Jul. 24, 2009

(86) PCT No.: PCT/JP2009/003488
§ 371 (c)(1),
(2), (4) Date: Jan. 27, 2011

(87) PCT Pub. No.: WO2010/016194
PCT Pub. Date: Feb. 11, 2010

(65) Prior Publication Data
US 2011/0164200 A1    Jul. 7, 2011

(30) Foreign Application Priority Data
Aug. 4, 2008    (JP) ................................. 2008-200625

(51) Int. Cl.
*G02F 1/1333*    (2006.01)
*G09G 3/36*    (2006.01)

(52) U.S. Cl.
USPC ............................................ 349/58; 345/102

(58) Field of Classification Search
USPC ......................................................... 349/58
See application file for complete search history.

(56) References Cited

U.S. PATENT DOCUMENTS

| 6,483,482 B1 | 11/2002 | Kim |
| 7,554,628 B2 | 6/2009 | Mitani et al. |

(Continued)

FOREIGN PATENT DOCUMENTS

| JP | 6-43479 A | 2/1994 |
| JP | 7-128652 A | 5/1995 |

(Continued)

OTHER PUBLICATIONS

Official Communication issued in International Patent Application No. PCT/JP2009/003488, mailed on Sep. 1, 2009.

(Continued)

*Primary Examiner* — Eric Wong
(74) *Attorney, Agent, or Firm* — Keating & Bennett, LLP

(57) ABSTRACT

A direct-viewing type display device 100 according to the present invention includes a plurality of display panels, having display regions 31a and 31b and frame regions 30a and 30b. The plurality of display panels include first and second display panels 10a and 10b adjoining each other; a frame region 30a of the first display panel is overlapped by a side face 18b of the second display panel, such that an angle θ between viewer-side surfaces 17a and 17b of the first and second display panels is less than 180°; first and second light guide elements 20a and 20b are disposed on a viewer's side of the peripheral display regions 32a and 32b; the first and second light guide elements have an incident face, an outgoing face, and a plurality of light guide paths; the distance between the incident face and the outgoing face of the first and second light guide elements increases away from the peripheral display region and toward the frame region; and the first light guide element is larger than the second light guide element. According to the present invention, there is provided a direct-viewing type display device in which frame regions of display panels, or a joint in the case of tiling, are obscured, the direct-viewing type display device being easier to produce than conventionally or incurring lower cost than conventionally.

12 Claims, 12 Drawing Sheets

(56) References Cited

U.S. PATENT DOCUMENTS

| | | | |
|---|---|---|---|
| 2002/0048438 A1 | 4/2002 | Veligdan | |
| 2008/0186252 A1 | 8/2008 | Li | |
| 2009/0304909 A1* | 12/2009 | Daniels | 427/66 |
| 2011/0025594 A1* | 2/2011 | Watanabe | 345/102 |
| 2011/0255301 A1* | 10/2011 | Watanabe | 362/558 |
| 2013/0135429 A1* | 5/2013 | Lablans | 348/36 |

FOREIGN PATENT DOCUMENTS

| | | |
|---|---|---|
| JP | 9-37194 A1 | 2/1997 |
| JP | 2000-56713 A | 2/2000 |
| JP | 2006-308707 A | 11/2006 |

OTHER PUBLICATIONS

Watanabe: "Display Device," U.S. Appl. No. 12/935,420, filed Sep. 29, 2010.

Watanabe, "Display Device," U.S. Appl. No. 13/129,428, filed Jun. 2, 2011.

Tomotoshi et al, "Display Apparatus and Method for Manufacturing Display Apparatus," U.S. Appl. No. 13/256,464, filed Sep. 14, 2011.

English translation of Official Communication issued in corresponding International Application PCT/JP2009/003488, mailed on Mar. 17, 2011.

* cited by examiner

FIG.5
(a)
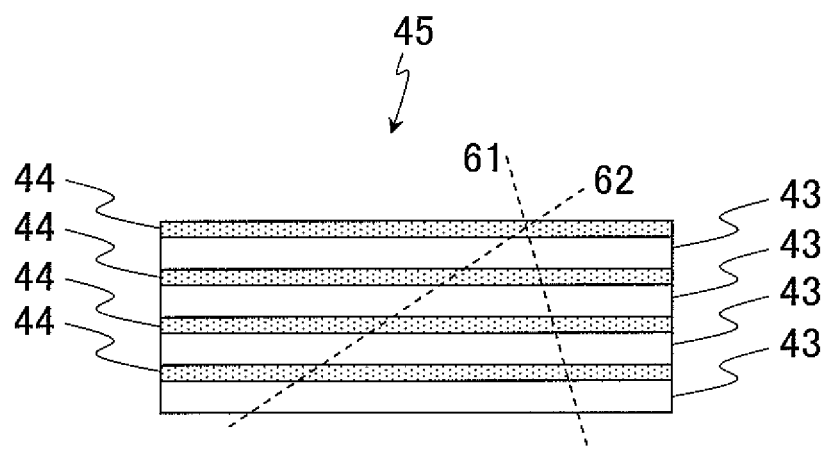
(b)

FIG.12
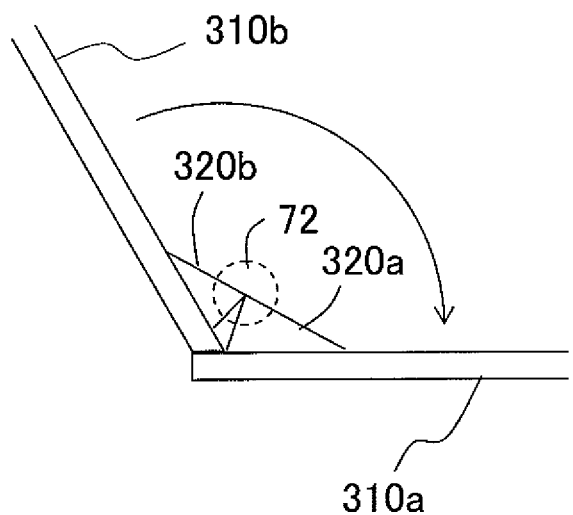
(a)
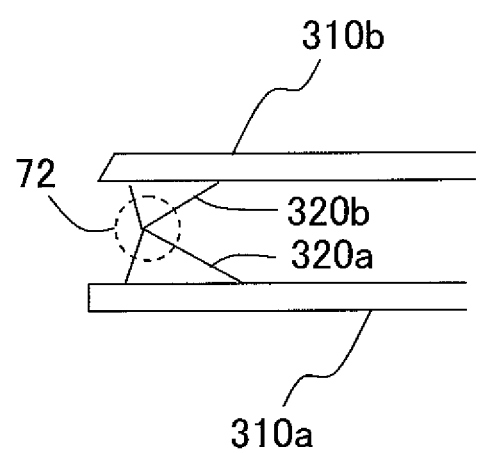
(b)

DISPLAY DEVICE

TECHNICAL FIELD

The present invention relates to a display device, and in particular to a direct-viewing type display device.

BACKGROUND ART

In recent years, there is a strong desire for an increase in the size of television sets and display devices for displaying information. Representative examples of large-sized display devices are display devices in which self-light-emitting elements such as light-emitting diodes (LEDs) are arranged in a matrix array and projection-type display devices; however, these have disadvantages in terms of image quality. Therefore, a further increase in the size of direct-viewing type liquid crystal display devices (LCDs) and plasma display devices (PDPs), which are capable of displaying with a high image quality, is being desired.

Since a direct-viewing type liquid crystal display device or a plasma display device is basically formed on a glass substrate, its screen size depends on the substrate size. Currently, the largest of glass substrates (mother substrates) that are used for the production of liquid crystal display devices are those of the eighth generation (2200 mm×2400 mm), and liquid crystal display devices whose diagonal is about 100 inches are being produced by using these substrates. The substrates that are available for mass production will become more increased in size, however at a slow rate. It is difficult to immediately provide display devices with the larger areas that are required on the current market.

Therefore, as a method of realizing a large-screen display device, there has been a conventional attempt of realizing a make-believe large-screen display device by arraying a plurality of display devices (which may be referred to as tiling). However, the tiling technique induces a problem of visible joints between the plurality of display devices. This problem will be described by taking a liquid crystal display device for example.

Note that a liquid crystal display device mainly includes a liquid crystal display panel, a backlight device, circuits for supplying various electrical signals to the liquid crystal display device, and a power supply, as well as a housing in which to accommodate these. The liquid crystal display panel mainly includes a pair of glass substrates and a liquid crystal layer provided therebetween. On one of the pair of glass substrates, pixel electrodes are formed in a matrix shape, and TFTs, bus lines, a driving circuit for supplying signals to them, and the like are formed, for example. On the other glass substrate, a color filter layer and a counter electrode are provided. The liquid crystal display panel has a display region in which a plurality of pixels are arrayed, and a frame region surrounding it. In the frame region, a sealing portion for allowing the pair of substrates to oppose each other and also sealing and retaining the liquid crystal layer, an implementation of driving circuitry for driving the pixels, and the like are provided.

Thus, since the frame region not contributing to any displaying exists in a liquid crystal display panel, when a large screen is constructed by arraying a plurality of liquid crystal display panels, the image will have joints. This problem is not limited to liquid crystal display devices, but is shared among direct-viewing type display devices, e.g., PDPs, organic EL display devices, and electrophoresis display devices.

Patent Document 1 discloses a construction which includes an optical fiber face plate covering the entire display panel, such that jointless displaying is performed by allowing the light going out from a display region to be guided to a non-display region by the optical fiber face plate.

Patent Document 2 discloses a construction in which an optical fiber face plate complex is provided on the entire display panel, such that jointless displaying is performed by allowing the light going out from a display region to be guided to a non-display region by the optical fiber face plate.

Patent Document 3 discloses a construction including an optical compensation means over substantially the entire display panel, the optical compensation means being composed of a multitude of slanted thin films and a transparent material filled between the slanted thin films, such that jointless displaying is performed by allowing light to be guided to a non-display region by the optical compensation means.

CITATION LIST

Patent Literature

[Patent Document 1] Japanese Laid-Open Patent Publication No. 7-128652
[Patent Document 2] Japanese Laid-Open Patent Publication No. 2000-56713
[Patent Document 3] Japanese Laid-Open Patent Publication No. 2001-5414

SUMMARY OF INVENTION

Technical Problem

Since an optical fiber face plate is an aggregate of optical fibers, it becomes increasingly difficult and costing to produce as it increases in area. The conventional techniques described in Patent Document 1 and Patent Document 2 require an optical fiber face plate covering substantially the entire display panel, and thus are not practical from the standpoint of the production method and cost particularly in large-sized display devices.

The technique described in Patent Document 3 differs from the techniques of Patent Documents 1 and 2 in that an optical compensation means composed of a multitude of slanted thin films and a transparent material filled between the slanted thin films is used, instead of an optical fiber face plate. However, it still requires the optical compensation means covering substantially the entire display panel, thus presenting problems similar to those of the techniques described in Patent Document 1 and Patent Document 2.

Note that Patent Document 2 states that a parallel plate (a fiber face plate whose incident face and outgoing face are parallel) to be disposed in the display region is omissible. However, when the parallel plate is omitted, an end face portion of a block-like (having a rectangular cross section) optical fiber face plate that is disposed at an edge portion of the display region forms a stepped portion within the display region, thus rendering the image discontinuous and detracting from display quality.

The present invention has been made in order to solve the above problems, and an objective thereof is to provide a direct-viewing type display device in which frame regions of display panels, or a joint in the case of tiling, are obscured, the direct-viewing type display device being easier to produce or incurring lower cost than conventionally. It is a particular objective to reduce the cost of a display device in which a plurality of display panels are provided at a predetermined angle.

Solution to Problem

A direct-viewing type display device according to the present invention comprises a plurality of display panels, having a display region and a frame region outside the display region, wherein, the plurality of display panels include first and second display panels adjoining each other; the frame region of the first display panel is overlapped by a side face of the second display panel, such that a viewer-side surface of the first display panel and a viewer-side surface of the second display panel constitute an angle of less than 180°; first and second light guide elements are disposed on a viewer's side of peripheral display regions adjoining the frame regions of the first and second display panels, respectively; the first and second light guide elements have an incident face, an outgoing face, and a plurality of light guide paths formed between the incident face and the outgoing face; a distance between the incident face and the outgoing face of the first and second light guide elements increases away from the peripheral display region and toward the frame region; and the first light guide element is larger than the second light guide element.

In one embodiment, an end of the outgoing face of the first light guide element closer to the second display panel abuts an end of the outgoing face of the second light guide element closer to the first display panel.

In one embodiment, the outgoing face of the first light guide element is parallel to the outgoing face of the second light guide element.

In one embodiment, shapes of the first and second light guide elements are triangular prisms.

In one embodiment, shapes of the first and second light guide elements are isosceles triangular prisms.

In one embodiment, the angle between the viewer-side surface of the first display panel and the viewer-side surface of the second display panel is θ; and shapes of the first and second light guide elements are isosceles triangular prisms with vertex angles of θ/2.

In one embodiment, shapes of the outgoing faces of the first and second light guide elements are cylindrical surfaces.

In one embodiment, a plurality of optical fibers are arrayed, in parallel, in at least one of the first and second light guide elements.

In one embodiment, a plurality of light guide layers are arrayed, in parallel, in at least one of the first and second light guide elements.

In one embodiment, the display device according to the present invention further comprises a backlight device on an opposite side of the second display panel from the viewer-side surface, wherein a side face of the backlight device closer to the first display panel is parallel to the viewer-side surface of the first display panel and overlaps the frame region of the first display panel.

In one embodiment, a light-diffusing layer is provided on the outgoing face of the first light guide element or the outgoing face of the second light guide element.

In one embodiment, the plurality of display panels include at least three display panels; and the at least three display panels are disposed in an annular shape.

Advantageous Effects of Invention

According to the present invention, there is provided a direct-viewing type display device in which frame regions of display panels, or a joint in the case of tiling, are obscured, the direct-viewing type display device being easier to produce than conventionally or incurring lower cost than conventionally. In particular, a display device in which a plurality of display panels are provided at a predetermined angle can be provided at low cost.

BRIEF DESCRIPTION OF DRAWINGS

FIG. 5 A diagram for describing production steps of the sheet laminate 40, where (a) shows a state before stacking, and (b) shows a state after stacking.

FIG. 12 An enlarged cross-sectional view of a movable section of the other display device 300 according to an embodiment of the present invention, where (a) shows an open state, and (b) shows a closed state.

DESCRIPTION OF EMBODIMENTS

Hereinafter, embodiments of the display device according to the present invention will be described with reference to the drawings.

Figure 1:
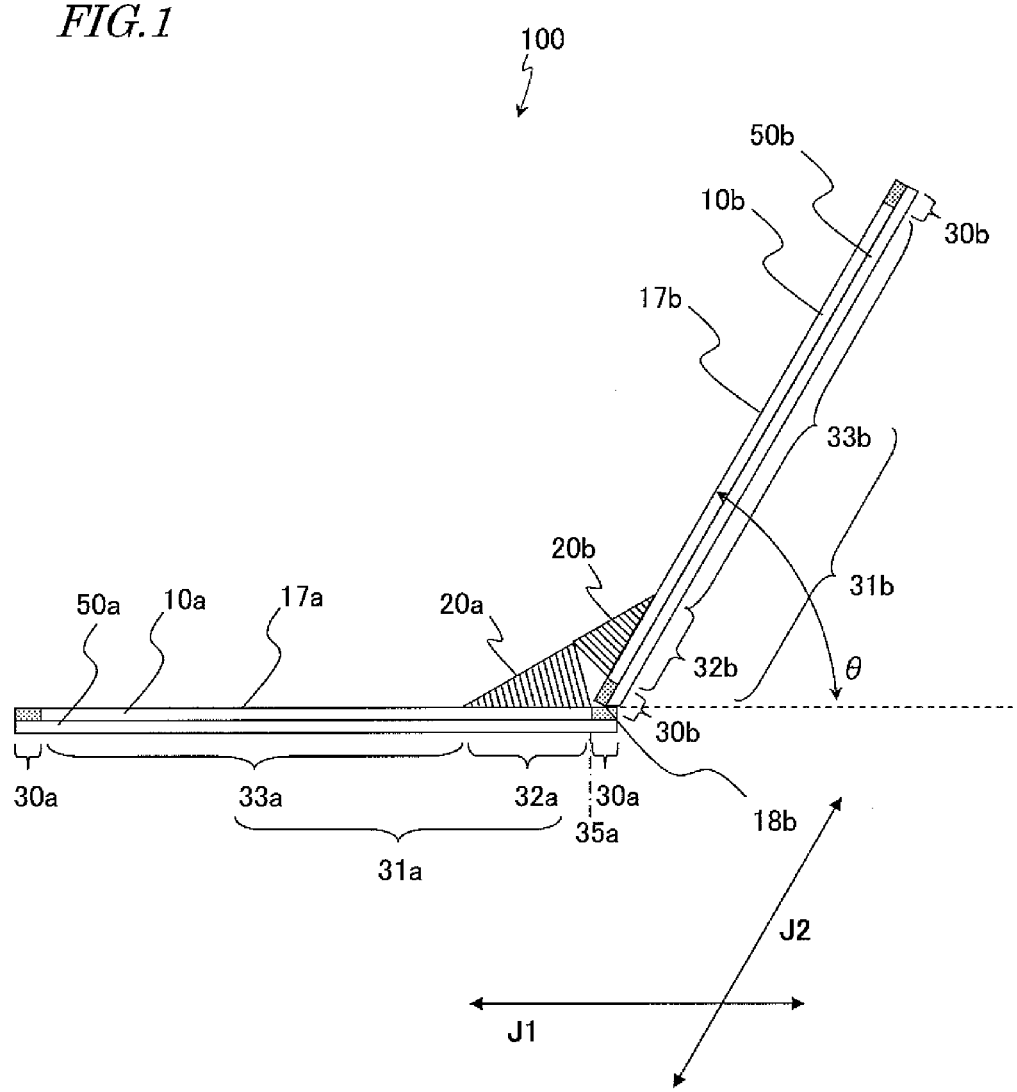
FIG. 1 A schematic cross-sectional view of a liquid crystal display device 100 according to an embodiment of the present invention.
Figure 2:
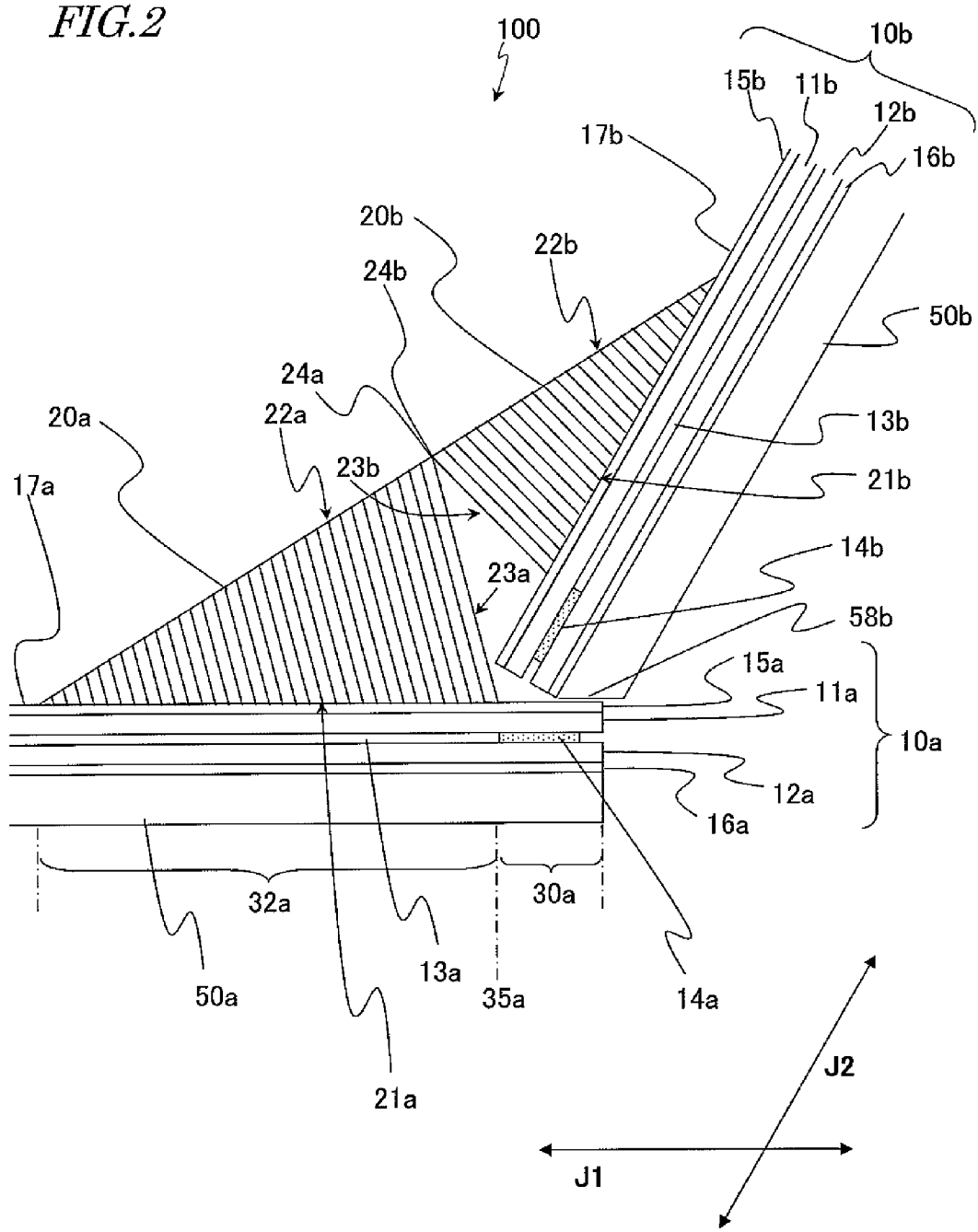
FIG. 2 A schematic enlarged cross-sectional view of a joint between liquid crystal display panels 10a and 10b.
Figure 3:
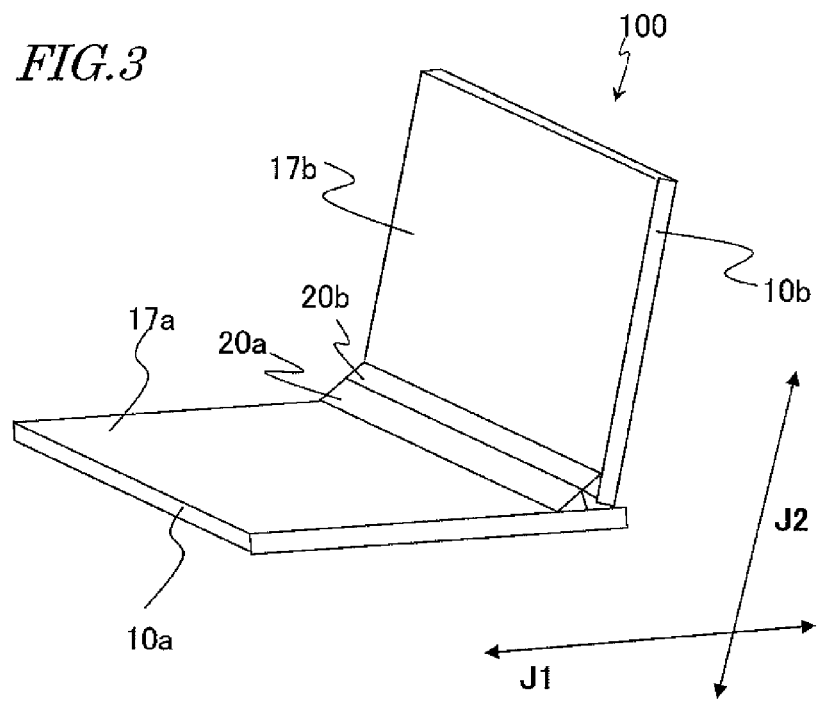
FIG. 3 A schematic perspective view of the liquid crystal display device 100 according to an embodiment of the present invention.

With reference to FIG. 1 to FIG. 3, the construction and operation of a display device according to an embodiment of the present invention will be described. Although a liquid crystal display device in which a liquid crystal display panel is used as the display panel will be illustrated below, the display panel to be used for a display device according to the present invention is not limited thereto. As the display panel, for example, a display panel for PDP, an organic EL display panel, an electrophoresis display panel, or the like can be used.

FIG. 1 is a schematic cross-sectional view of a liquid crystal display device 100 according to an embodiment of the present invention. The liquid crystal display device 100 shown in FIG. 1 includes two adjoining liquid crystal display panels 10a and 10b, and two light guide elements 20a and 20b. The liquid crystal display device 100 is a liquid crystal display device which is tiled with two liquid crystal display panels 10a and 10b disposed at a predetermined angle (i.e., θ, described later). Tiling can be achieved by known methods. FIG. 2 is an enlarged view of a joint between the liquid crystal display panel 10a and the liquid crystal display panel 10b of the liquid crystal display device 100. The joint of the liquid crystal display device 100 will be described later. FIG. 3 is a schematic perspective view of the liquid crystal display device 100 according to an embodiment of the present invention. FIG. 1 is a cross-sectional view of the liquid crystal display device 100 of FIG. 3 taken along a plane which is perpendicular to viewer-side surfaces 17a and 17b of the liquid crystal display panels 10a and 10b.

As shown in FIG. 1 and FIG. 2, a light guide element 20a is provided on the viewer-side surface 17a of the liquid crystal display panel 10a. The liquid crystal display device 100 is a transmission type, and includes a backlight device 50a provided on the opposite side (lower side in FIG. 1 and FIG. 2) of the liquid crystal display panel 10a from the viewer's side. The liquid crystal display device 100 performs displaying by modulating light which is emitted from the backlight device 50a through the liquid crystal display panel 10a. Similarly to the liquid crystal display panel 10a, a light guide element 20b is provided on the viewer-side surface 17b of the liquid crystal display panel 10b, and a backlight device 50b is provided on the opposite side from the viewer's side.

Although the liquid crystal display device 100 includes two liquid crystal display panels 10a and 10b, it may include more display panels. Examples of display devices having three or more display panels will be described later.

The liquid crystal display panel 10a may be any known liquid crystal display panel, and is a TFT liquid crystal display panel of the VA mode. As shown in FIG. 2, the liquid crystal display panel 10a includes a TFT substrate 12a and a counter substrate 11a, with a liquid crystal layer 13a being provided between the TFT substrate 12a and the counter substrate 11a. TFTs and pixel electrodes are provided on the TFT substrate 12a, whereas color filters and a counter electrode are provided on the counter substrate 11a. The liquid crystal layer 13a is retained between the counter substrate 11a and the TFT substrate 12a by means of a sealing portion 14a. On the viewer's side of the counter substrate 11a (upper side in FIG. 2) and the opposite side (lower side in FIG. 2) of the TFT substrate 12a from the viewer's side, optical film portions 15a and 16a are provided, respectively. The optical film portions 15a and 16a include polarizers and optionally phase plates. Similarly to the liquid crystal display panel 10a, the liquid crystal display panel 10b includes a counter substrate 11b, a TFT substrate 12b, a liquid crystal layer 13b, a sealing portion 14b, optical film portions 15b and 16b, and the like.

The liquid crystal display panels 10a and 10b have display regions 31a and 31b, in which a plurality of pixels are arrayed, and frame regions 30a and 30b lying outside the display regions 31a and 31b. The frame regions 30a and 30b include regions where the sealing portions 14a and 14b, terminals of various wiring lines, driving circuitry, and the like are provided. Generally speaking, light shielding films are formed in the frame regions 30a and 30b. Therefore, the frame regions 30a and 30b do not contribute to displaying.

In the display region 31a of the liquid crystal display panel 10a, a plurality of pixels (not shown) are arranged in a matrix array having rows and columns. The row direction corresponds to the horizontal direction in the display plane of the liquid crystal display panel 10a (a direction which is perpendicular to the plane of the figure of FIG. 1), whereas the column direction corresponds to the vertical direction in the display plane (the right-left direction in the plane of the figure of FIG. 1). In the display region 31b of the liquid crystal display panel 10b, a plurality of pixels are arranged in a matrix array having rows and columns, similarly to the liquid crystal display panel 10a.

The backlight devices 50a and 50b are direct-type backlight devices having a plurality of fluorescent lamps which are parallel to one another, for example. Note that, as will be described later, those which allow for the adjustment of luminance distribution are preferable.

As shown in FIG. 1, the liquid crystal display panel 10a and the liquid crystal display panel 10b are placed so that the angle between the viewer-side surface 17a of the liquid crystal display panel 10a and the viewer-side surface 17b of the liquid crystal display panel 10b is a predetermined angle θ (0°<θ<180°). As shown in FIG. 1, the angle θ represents an angle which is constituted by the viewer-side surface 17b of the liquid crystal display panel 10b and a plane which is an extension of the viewer-side surface 17a of the liquid crystal display panel 10a toward the liquid crystal display panel 10b.

The angle θ may be set to various angles depending on the product form, but it is assumed in the liquid crystal display device 100 that θ=60°.

The liquid crystal display panels 10a and 10b are disposed so that the frame region of one liquid crystal display panel overlaps a side face of the other liquid crystal display panel. In the liquid crystal display device 100, a side face 18b of the liquid crystal display panel 10b overlaps the frame region 30a of the liquid crystal display panel 10a.

As shown in FIG. 2, the light guide element 20a disposed on the viewer's side of the liquid crystal display panel 10a includes an incident face 21a, an outgoing face 22a, and a plurality of light guide paths formed between the incident face 21a and the outgoing face 22a. The incident face 21a of the light guide element 20a overlaps an peripheral display region 32a, which is a region of the display region 31a of the liquid crystal display panel 10a that adjoins the frame region 30a along a first axis (J1). Note that the incident face 21a overlaps the peripheral display region adjoining a portion of the frame region 30a that is on the side adjoining the liquid crystal display panel 10b along the first axis J1. Moreover, the incident face 21a is disposed so as to be parallel to the viewer-side surface 17a of the liquid crystal display panel 10a. Herein, the first axis J1 is assumed to be an axis extending parallel to the column direction of the liquid crystal display panel 10a (i.e., a vertical direction in the display plane of the liquid crystal display panel 10a). The distance between the incident face 21a and the outgoing face 22a increases away from the peripheral display region 32a and toward the frame region 30a (from left to right in FIG. 2) along the first axis J1. In the liquid crystal display device 100, the incident face 21a extends to a boundary 35a between the peripheral display region 32a and the frame region 30a.

Similarly to the light guide element 20a, the light guide element 20b includes an incident face 21b, an outgoing face 22b, and a plurality of light guide paths formed between the incident face 21b and the outgoing face 22b. The incident face 21b is disposed so as to overlap a peripheral display region 32b, which is a region of the display region 31b of the liquid crystal display panel 10b that adjoins the frame region 30b along a second axis J2 (the frame region 30b, the display region 31b, and the peripheral display region 32b are shown in FIG. 1). The distance between the incident face 21b and the outgoing face 22b increases away from the peripheral display region 32b and toward the frame region 30b along the second axis J2. Herein, the second axis J2 is assumed to be an axis extending parallel to the column direction of the liquid crystal display panel 10b (i.e., a vertical direction in the display plane of the liquid crystal display panel 10b).

In the liquid crystal display device 100 of the present embodiment, the light guide element 20a has a triangular cross-sectional shape. The overall shape of the light guide element 20a is a triangular prism whose cross section that is perpendicular to the longitudinal direction is a triangle. This triangular prism is defined by the incident face 21a, the outgoing face 22a, and the side face 23a. Similarly, the overall shape of the light guide element 20b is a triangular prism whose cross section that is perpendicular to the longitudinal direction is a triangle, this triangular prism being defined by the incident face 21b, the outgoing face 22b, and the side face 23b. In the liquid crystal display device 100, the light guide elements 20a and 20b are disposed so that their longitudinal directions are parallel to the horizontal directions in the display planes of the liquid crystal display panels 10a and 10b.

Since the shape of the light guide element 20a is a triangular prism, the outgoing face 22a lies closer to the viewer's side than is the viewer-side surface 17a of the liquid crystal display panel 10a. Similarly, since the shape of the light guide element 20b is a triangular prism, the outgoing face 22b lies closer to the viewer's side than is the viewer-side surface 17b of the liquid crystal display panel 10b. Therefore, on the viewer's side of the peripheral display region 32a, the frame region 30a, the frame region 30b, and the peripheral display region 32b, the outgoing faces 22a and 22b exist.

The light guide element 20a and the light guide element 20b are optical fiber face plates composed of a group of optical fibers, for example. As is well known, each optical fiber includes a core and a cladding, such that light propagates within the core. That is, the core of each optical fiber functions as one light guide path. The group of optical fibers which the optical fiber face plate includes are formed so that the length directions of the optical fibers are aligned in parallel. In the light guide elements 20a and 20b of the present embodiment, a plurality of optical fibers are arranged in a direction which is perpendicular to the longitudinal direction of the light guide elements 20a and 20b. As shown in FIG. 2, in the light guide element 20a of the liquid crystal display device 100 of the present embodiment, optical fibers are arrayed in parallel to the side face 23a of the light guide element 20a. Similarly, in the light guide element 20b, optical fibers are arrayed in parallel to the side face 23b of the light guide element 20b.

Light which enters the light guide element 20a through the incident face 21a propagates within the optical fibers in parallel to the side face 23a, and goes out at the outgoing face 22a toward the viewer's side. As described above, the incident face 21a overlaps the peripheral display region 32a of the liquid crystal display panel 10a. Therefore, light going out of the pixels within the peripheral display region 32a enters the light guide element 20a at the incident face 21a, propagates through the respective light guide paths which are parallel to the side face 23a, and goes out from the outgoing face 22a. Therefore, an image which is formed in the peripheral display region 32a is displayed on the viewer's side of the light guide element 20a. In the liquid crystal display device 100 of the present embodiment, the light guide element 20b is an optical fiber face plate similar to the light guide element 20a, such that light going out of the pixels within the peripheral display region 32b enters the light guide element 20b from the incident face 21b, propagates through the respective light paths which are parallel to the side face 23b, and goes from the outgoing face 22b. Therefore, an image which is formed in the peripheral display region 32b of the liquid crystal display panel 10b is displayed on the viewer's side of the light guide element 20b.

Since the outgoing faces 22a and 22b are present on the viewer's side of the peripheral display region 32a, the frame region 30a, the frame region 30b, and the peripheral display region 32b, images which are formed in the peripheral display regions 32a and 32b are displayed on the viewer's side of the light guide elements 20a and 20b, whereby the frame regions 30a and 30b are obscured. As a result, in the liquid crystal display device 100, the joint between the liquid crystal display panel 10a and the liquid crystal display panel 10b is obscured.

As shown in FIG. 2, in the liquid crystal display device 100 of the present embodiment, an end 24a of the outgoing face 22a of the light guide element 20a closer to the liquid crystal display panel 10b (corresponding to a line of intersection between the outgoing face 22a and the side face 23a) abuts an end 24b of the outgoing face 22b of the light guide element 20b closer to the liquid crystal display panel 10a (corresponding to a line of intersection between the outgoing face 22b and the side face 23b). Therefore, in the liquid crystal display device 100, the outgoing face 22a and the outgoing face 22b are visually recognized as continuous. This realizes displaying with further obscured joints. Furthermore, in the liquid crystal display device 100 of the present embodiment, the outgoing face 22a of the light guide element 20a and the outgoing face 22b of the light guide element 20b are parallel. Therefore, the outgoing face 22a and the outgoing face 22b are coplanar, such that a viewer will visually recognize the outgoing faces 22a and 22b as constituting one plane. This realizes displaying with further obscured joints. In other words, the liquid crystal display device 100 of the present embodiment is able to display a continuous image with no joints, because of the outgoing face 22a of the light guide element 20a and the outgoing face 22b of the light guide element 20b being coplanar. The designing of the light guide elements will be described later.

The optical fiber face plates to be used as the light guide element 20a and the light guide element 20b can be produced by, from an optical fiber face plate which has been formed in a plate shape, cutting out its incident face and outgoing face so as to define a triangular prism shape. For example, an optical fiber face plate made of quartz (e.g., whose core has a refractive index of 1.8 and whose cladding has a refractive index of 1.5) can be suitably used as an optical fiber face plate. The greater the refractive index difference between the core and the cladding increases, the numerical aperture (NA: Numerical Aperture) of the optical fibers is, the more preferable it is because the light transmittance is increased; however, there is no particular limitation as to the refractive indices of the core and the cladding. Moreover, there is no particular limitation as to the material of the optical fibers, and a transparent resin material such as an acrylic resin may be used.

Moreover, sheet laminates may be used as the light guide elements 20a and 20b. A sheet laminate is a laminate of at least two or more types of light guide layers having different refractive indices, such that the light guide layers are stacked in a direction which is perpendicular to the longitudinal direction (direction of light propagation), so as to be parallel to one another.

Figure 4:
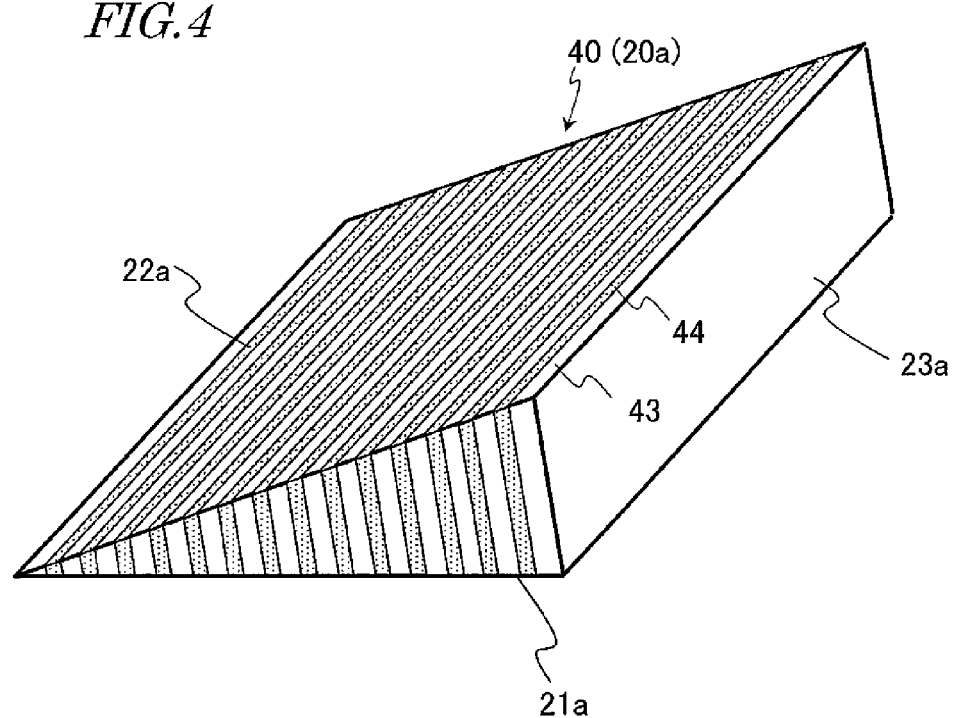
FIG. 4 A schematic perspective view of a sheet laminate 40.

FIG. 4 shows a perspective view of a sheet laminate 40 of a triangular prism shape. The sheet laminate 40 is composed of a laminate of light guide layers (base) 43 functioning as cores and low-refractive index resin layers 44 functioning as claddings. FIG. 4 also shows an incident face 21a, an outgoing face 22a, and a side face 23a of the case where the light guide element 20a is composed of a sheet laminate. As shown in FIG. 4, in the case where a sheet laminate is used as the light guide element 20a, the side face 23a lies perpendicular to the direction in which the layers in the sheet are stacked. In the case where sheet laminates 40 are used as the light guide elements 20a and 20b, the light guide layers 43 and the low-refractive index resin layers 44 of the sheet laminates 40 are to be disposed parallel to the side face 23a of the light guide element 20a and the side face 23b of the light guide element 20b in FIG. 2. A display device in which the sheet laminates 40 are used as the light guide elements operates under the same displaying principles as the liquid crystal display device 100 in which optical fiber face plates are used.

In the liquid crystal display device 100 of the present embodiment, optical fiber face plates are used for both light guide elements 20a and 20b; however, an optical fiber face plate may be used for one of the two light guide elements, and a sheet laminate may be used for the other.

A method of producing a sheet laminate 40 will be described with reference to FIG. 5.

As shown in FIG. 5(a), on one surface of a base 43 composed of a light-transmitting material such as an acrylic resin or glass, a low-refractive index resin layer 44 containing a fluorine-type compound, which has a lower refractive index than that of the base 43, e.g., Opster (trade name) manufactured by JSR Corporation, is provided, and then is allowed to dry and cure. Next, after a plurality of layers of base are stacked with layers having tackiness or adhesiveness interposed therebetween, they are cured in such a manner that the respective layers will not delaminate. Thus, the laminate 45 having a plurality of stacked layers is obtained (FIG. 5(b)). As the material having tackiness or adhesiveness, a thermosetting resin, a thermoplastic resin, a UV-curing resin material, or the like can be used. The thickness of the layers having tackiness or adhesiveness should preferably be as thin as possible, so long as a high light-transmitting property, little light scattering ability, and a sufficient strength after curing are obtained. However, this thickness is preferably equal to or greater than the order of magnitude of light wavelength (several hundred nanometers). In the case where the base 43 and the low-refractive index resin layers 44 have tackiness or adhesiveness, there is no particular need to separately provide tacky layers or adhesion layers.

Next, the laminate 45 is cut at cut surfaces (indicated by broken lines 61 and 62). By cutting the laminate 45 in directions which are oblique to the face on which the base 43 and the low-refractive index resin layers 44 adhere to each other, as indicated by the broken lines 61 and 62, and optionally polishing the cut surfaces for an improved exterior appearance, the sheet laminate 40 having the triangular prism shape shown in FIG. 4 is obtained.

In the sheet laminate 40, the base 43 acts as cores, whereas the low-refractive index resin layers 44 act as claddings. As described above, as the refractive index difference between the core and the cladding increases, the numerical aperture (NA) of an optical fiber increases, which is preferable because of increased light transmittance; however, there is no particular limitation as to the refractive index.

Next, with reference to FIG. 6, the angle ($\theta$) between the liquid crystal display panel 10a and the liquid crystal display panel 10b and exemplary design values of the light guide elements 20a and 20b will be described.

Figure 6:
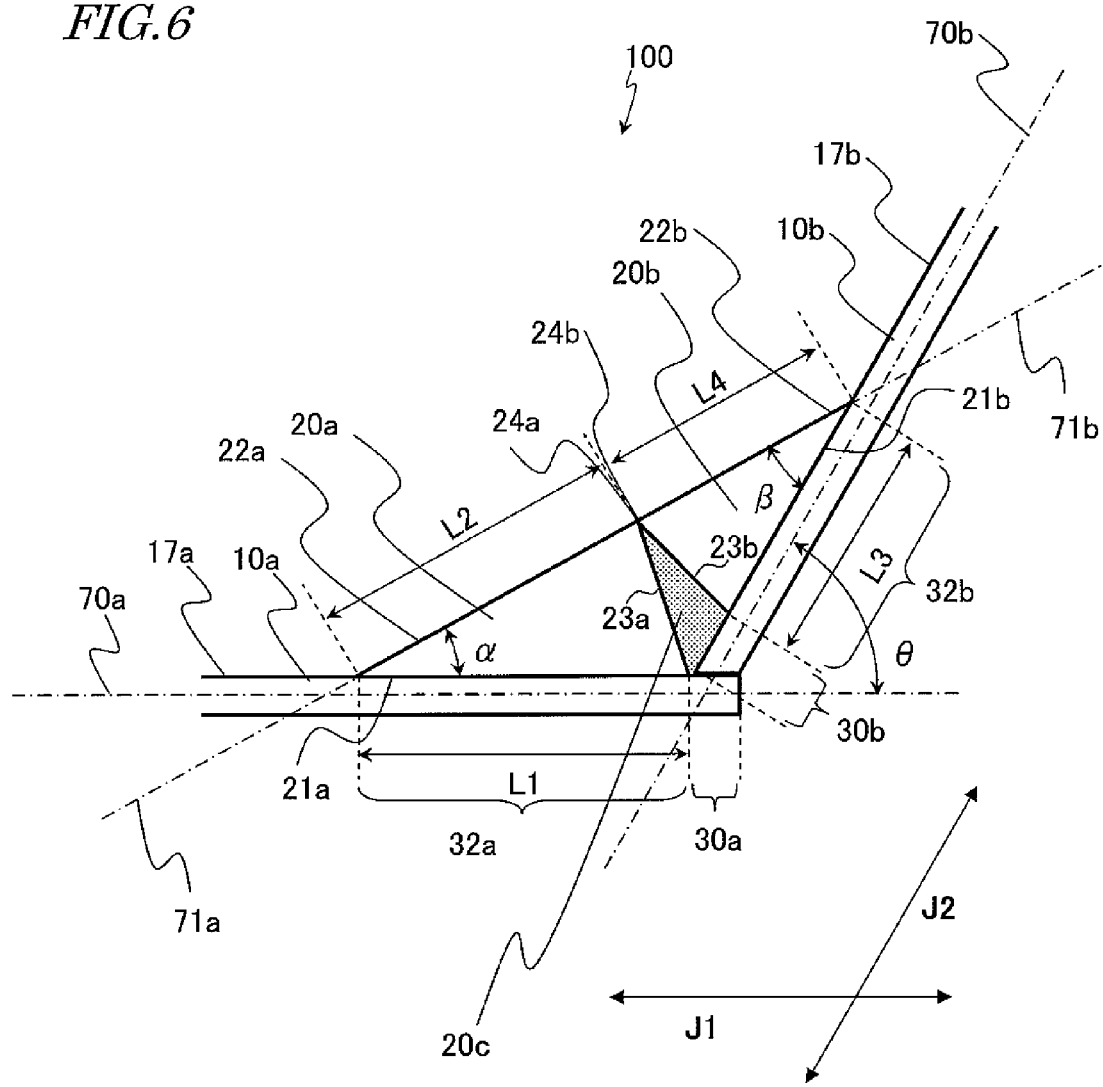
FIG. 6 A schematic diagram for describing an example of an angle θ between the liquid crystal display panel 10a and liquid crystal display panel 10b and exemplary design values of light guide elements 20a and 20b.

FIG. 6 is a cross-sectional view schematically showing the relationship between the liquid crystal display panels 10a and 10b and the light guide elements 20a and 20b. The direction of a plane which is parallel to the viewer-side surface 17a of the liquid crystal display panel 10a is indicated by a dot-dash line 70a, whereas the direction of a plane which is parallel to the viewer-side surface 17b of the liquid crystal display panel 10b is indicated by a dot-dash line 70b. Since the incident face 21a of the light guide element 20a is parallel to the viewer-side surface 17a of the liquid crystal display panel 10a, the line 70a is parallel to the incident face 21a. Similarly, the line 70b is parallel to the incident face 21b of the light guide element 20b. Moreover, the direction of a plane which is parallel to the outgoing face 22a of the light guide element 20a is indicated by a dot-dash line 71a, whereas a direction which is parallel to the outgoing face 22b of the light guide element 20b is indicated by a dot-dash line 71b.

The angle between the line 70a and the line 70b is equal to the angle $\theta$ between the viewer-side surface 17a of the liquid crystal display panel 10a and the viewer-side surface 17b of the liquid crystal display panel 10b.

The angle between the line 70a and the line 71a is designated $\alpha$, and the angle between the line 70b and the line 71b is designated $\beta$. $\alpha$ and $\beta$ are vertex angles of the triangular prism.

Moreover, lengths of the incident faces 21a and 21b and the outgoing faces 22a and 22b of the light guide elements 20a and 20b, in a cross section perpendicular to their longitudinal directions, are set as follows.

L1: length of the incident face 21a of the light guide element 20a

L2: length of the outgoing face 22a of the light guide element 20a

L3: length of the incident face 21b of the light guide element 20b

L4: length of the outgoing face 22b of the light guide element 20b

Assuming that $\alpha=\beta=\theta/2$, the angle between the line 70a and the line 71a and the angle between the line 70b and the line 71b are equal. Since $\alpha+\beta=\theta$ in this case, the line 71a is parallel to the line 71b. This means that the outgoing face 22a and the outgoing face 22b are coplanar. Moreover, as described earlier, the end 24a of the outgoing face 22a abuts the end 24b of the outgoing face 22b in the liquid crystal display device 100 of the present embodiment. Therefore, the line 71a and the line 71b form one continuous straight line. That is, the outgoing face 22a and the outgoing face 22b constitute one continuous plane. For this reason, the liquid crystal display device 100 of the present embodiment has a better appearance and a higher image display quality than in the case where the outgoing faces are not coplanar.

If L1 and L2 are not equal, the image will be enlarged or reduced. If L1<L2, an image which is formed in the peripheral display region 32a of the liquid crystal display panel 10a is enlarged by the light guide element 20a when displayed on the viewer's side. In this case, the peripheral display region 32a needs to form a compressed image relative to the image that is formed in a central display region 33a, which is a region of the display region 31a other than the peripheral display region 32a, and thus trouble and cost are incurred. On the other hand, if L1>L2, an image which is formed in the peripheral display region 32a of the liquid crystal display panel 10a is reduced by the light guide element 20a when displayed on the viewer's side. Similarly to the case where L1<L2, trouble and cost are incurred. The methods of enlarging or reducing an image will be described later.

Thus, it is preferable that L1 and L2 are equal. This would mean that the shape of a cross section of the light guide element 20a (a cross section which is perpendicular to the longitudinal direction) is an isosceles triangle. In this case, the overall shape of the light guide element 20a is an isosceles triangular prism.

For similar reasons, it is also preferable in the light guide element 20b that L3 and L4 are equal, so that the overall shape is an isosceles triangular prism.

Thus, the shapes of the cross sections of the optimum light guide elements 20a and 20b which are perpendicular to their longitudinal directions are mutually similar isosceles triangles.

This is only an optimum scenario, and it is not a requirement that $\alpha=\beta=\theta/2$, and it is not a requirement that L1=L2 and L3=L4.

Note that, as shown in FIG. 6, L1>L3 and L2>L4. That is, the light guide element 20a is larger than the light guide element 20b. This is because, as described earlier, the frame region 30a of the liquid crystal display panel 10a overlaps the side face 18b of the liquid crystal display panel 10b in the liquid crystal display device 100 of the present embodiment. Conversely, in the case where the side face of the liquid crystal display panel 10a is arranged to overlap the frame region 30b of the liquid crystal display panel 10b, the light guide element 20b becomes larger than the light guide element 20a.

Note that a region 20c (dotted area in FIG. 6) which is surrounded by the following three faces is an ineffective region not contributing to displaying: the side face 23a of the light guide element 20a, the side face 23b of the light guide element 20b, and a portion of the viewer-side surface 17b of the liquid crystal display panel 10b that corresponds to the frame region 30b. Therefore, the region 20c may be a gap; alternatively, a member which is composed of a resin material or the like may be placed therein. Furthermore, a portion of the light guide element 20a or 20b may be formed so as to protrude into the region 20c. In that case, the overall shape of the light guide element will be different from the aforementioned isosceles triangular prism. The above discussion only intends that the shape of the effective region be an isosceles triangular prism, and the effects will not be lost even if the light guide element protrudes into the ineffective region, such that the overall shape is no longer an isosceles triangular prism.

Design values of the liquid crystal display device 100 of the present embodiment are shown below.

$\alpha=\beta=\theta/2=30°$
L1=L2=14.9 mm
L3=L4=10.9 mm

The width of each of the frame regions 30a and 30b is 4 mm.

Next, Reference Example will be described.

Figure 7:
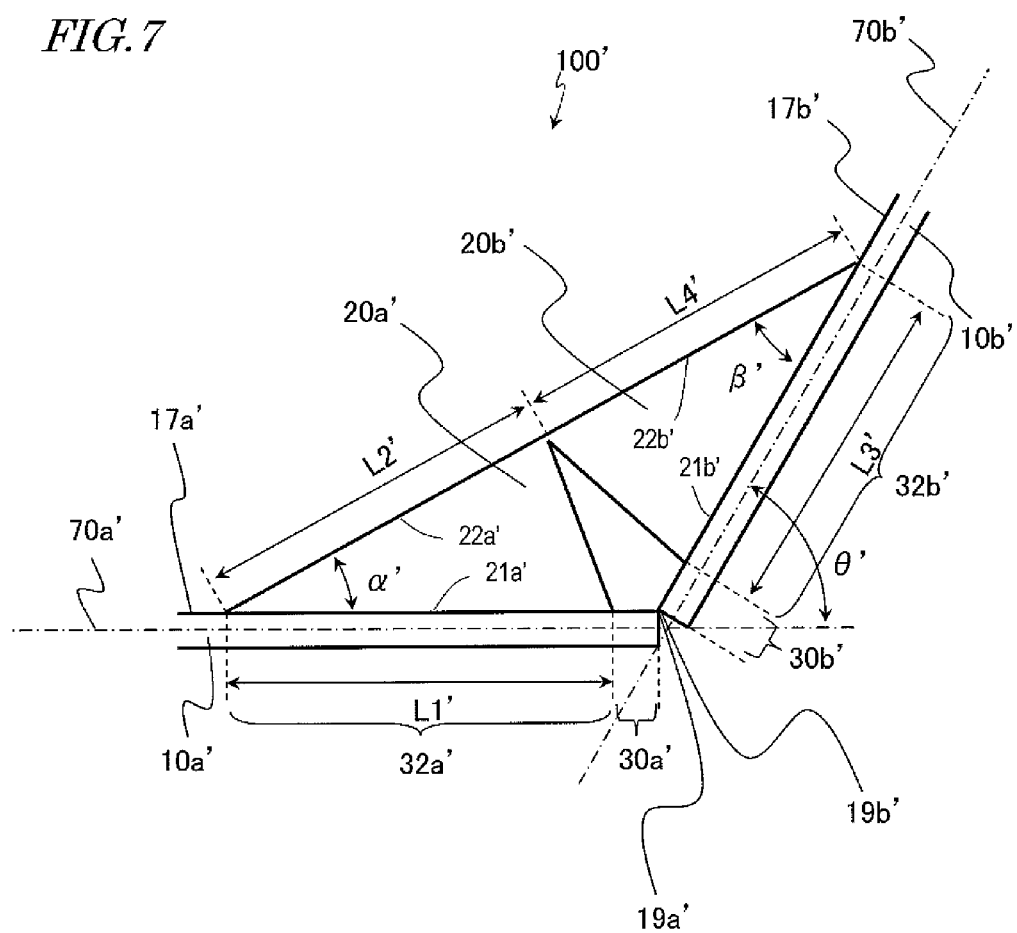
FIG. 7 A schematic cross-sectional view of a display device 100' according to Reference Example.

FIG. 7 is a cross-sectional view of a liquid crystal display device 100' according to Reference Example. The liquid crystal display device 100' includes liquid crystal display panels 10a' and 10b' similar to the liquid crystal display panels 10a and 10b of the liquid crystal display device 100, and light guide elements 20a' and 20b'. In the liquid crystal display device 100', the liquid crystal display panels 10a' and 10b' are disposed so that their viewer-side edges 19a' and 19b' abut each other at an angle θ'. Note that the angle θ' is an angle between a direction 70a' which is parallel to a viewer-side surface 17a' of the liquid crystal display panel 10a' and a direction 70b' which is parallel to a viewer-side surface 17b' of the liquid crystal display panel 10b'. Moreover, the light guide elements 20a' and 20b' are disposed respectively on the viewer-side surfaces 17a' and 17b' of the liquid crystal display panels 10a' and 10b'. The light guide elements 20a' and 20b' are disposed on the viewer's side of peripheral display regions 32a' and 32b''.

The light guide elements 20a' and 20b' have a triangular prism shape, such that light going out of the peripheral display regions 32a' and 32b' is allowed to be emitted toward the viewer's side by the light guide elements 20a' and 20b''. As a result, images which are formed in the peripheral display regions 32a' and 32b' are displayed on the viewer's side of the light guide elements 20a' and 20b', whereby the frame regions 30a' and 30b' are obscured and a jointless image is displayed.

The liquid crystal display device 100 of the present embodiment and the liquid crystal display device 100' according to Reference Example differ in terms of where the two display panels are connected. As described above, in the liquid crystal display device 100 of the present embodiment, the side face 18b of the liquid crystal display panel 10b overlaps the frame region 30a of the liquid crystal display panel 10a; however, in the liquid crystal display device 100' according to Reference Example, the viewer-side edges 19a' and 19b' of the display panels 10a' and 10b' abut each other.

In the liquid crystal display device 100' according to Reference Example, the light guide elements 20a' and 20b' have the following design values.

$\alpha'=\beta'=\theta'/2=30°$
L1'=L2'=L3'=L4'=25.7 mm

Note that α' and β' are vertex angles of the light guide elements 20a' and 20b', which are triangular prisms. L1' and L2' are lengths of the incident face 21a' and the outgoing face 22a' of the light guide element 20a', respectively, whereas L3' and L4' are lengths of the incident face 21b' and the outgoing face 22b' of the light guide element 20b', respectively. The width of the frame regions 30a' and 30b' is 4 mm, as in the liquid crystal display device 100 of the present embodiment.

Comparisons between the volumes of the light guide elements 20a and 20b of the liquid crystal display device 100 of the present embodiment and the volumes of the light guide elements 20a' and 20b' of the liquid crystal display device 100' according to Reference Example are shown below.

20a:20a'=34:100
20b:20b'=18:100

In the liquid crystal display device 100 of the present embodiment, the volumes of the light guide element 20a and the light guide element 20b were reduced to about ⅓ and about ⅕ of those in the liquid crystal display device 100' according to Reference Example. In the liquid crystal display device 100 of the present embodiment, the volumes of the light guide elements can be kept small because the frame region of one display panel is overlapped by the side face of the other display panel. Thus, the liquid crystal display device 100 of the present embodiment makes it possible to obtain similar effects to those of Reference Example, in spite of the reduced amount of costly light guide element material used, and therefore is very useful.

In the liquid crystal display device 100' according to Reference Example described above, the viewer-side edges 19a' and 19b' of the display panels 10a' and 10b' abut each other, and L1'=L2'=L3'=L4', such that the light guide elements 20a' and 20b' are of the same size. In the liquid crystal display device 100 of the present embodiment, L3 and L4 are smaller than L1 and L2, respectively. That is, the light guide element 20b is smaller than the light guide element 20a. The light guide element 20a is smaller than the light guide elements 20a' and 20b', but the light guide element 20b can be even smaller.

The liquid crystal display device 100' according to Reference Example is easy to produce and incurs low cost because it does not require a large-area optical fiber face plate as does the conventional display device described in Patent Document 1-3 mentioned above. However, in the display device of the present embodiment, the light guide elements can be made even smaller in size. Therefore, according to the present invention, a further cost reduction is possible.

Light-diffusing layers may be provided on the viewer's side of the outgoing faces 22a and 22b of the light guide elements 20a and 20b. By providing light-diffusing layers, light outgoing from the outgoing face is diffused, thus producing an effect of expanding the viewing angle of the liquid crystal display device 100. As the light-diffusing layers, known light-diffusing layers or light-diffusing elements can be use. For example, scattering films containing microparticles, diffuse reflections having a surface with minute bumps and dents randomly formed thereon, prism sheets such as BEF from Sumitomo 3M COMPANY, or light-diffusing elements such as microlens arrays can be used.

Figure 8:
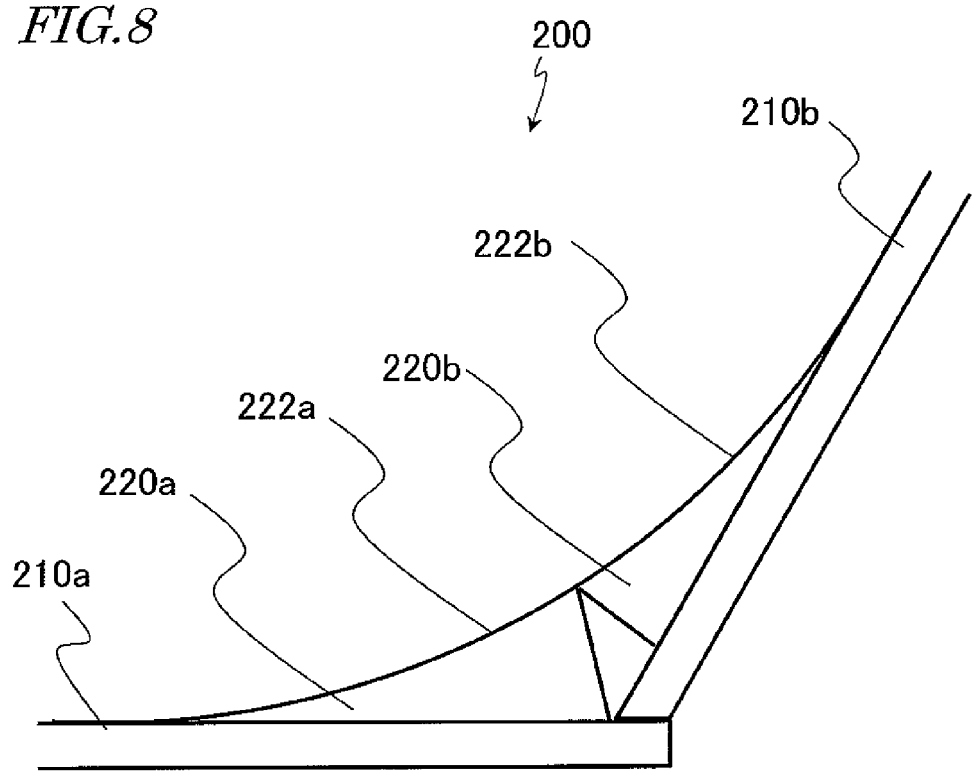
FIG. 8 A schematic cross-sectional view of another display device 200 according to an embodiment of the present invention.

Moreover, the outgoing faces 22a and 22b of the light guide elements 20a and 20b do not need to be planar, and light guide elements whose outgoing faces are curved surfaces can be used. In the liquid crystal display device 100 of the present embodiment, cross sections of the light guide elements 20a and 20b (cross sections perpendicular to their longitudinal directions) are triangles, and the outgoing faces 22a and 22b present straight lines in their cross sections. However, as in the light guide elements 220a and 220b of the display device 200 shown in FIG. 8, for example, outgoing faces 222a and 222b may each present an arc of a circle in their cross sections. The outgoing faces 222a and 222b in this case present cylindrical surfaces. Of course, the outgoing faces of the light guide elements do not need to be cylindrical surfaces, and can be freely designed in any shape, so long as the thickness increases toward the frame region and away from the peripheral display region.

Note that, in the case where the distance between the liquid crystal layer of the liquid crystal display panel 10a or 10b and the light guide element is large, or a light-diffusing layer exists therebetween, an image which is seen through the light guide elements may be blurred. Therefore, it is preferable that the thicknesses of the viewer-side substrate (counter substrate 11a, 11b) of the liquid crystal display panel 10a, 10b and the optical film portion 15a, 15b provided on the viewer's side of the viewer-side substrate is as small as possible, (e.g., the thickness of the substrate is 0.3 mm; and the thickness of the optical film portion is 0.1 mm), and that there is a high transmittance for parallel light (i.e., there is little diffusion). For similar reasons, it is preferable to use a material not containing any particles that diffuse light as the adhesive (including a tackiness agent) that is provided on the viewer's side of each liquid crystal display panel, e.g., a tacky film included in the optical film portion.

In the liquid crystal display device 100 of the present embodiment, a side face 58b (shown in FIG. 2) of the liquid crystal display panel 10a of the backlight device 50b, which is disposed on the opposite side of the liquid crystal display panel 10b from the viewer's side, is parallel to the viewer-side surface 17a of the liquid crystal display panel 10a. In other words, the side face 58b is formed obliquely so that the angle between the side face 58b and the viewer-side surface 17b of the liquid crystal display panel 10b is equal to the angle θ between the viewer-side surface 17a and the viewer-side surface 17b. Moreover, a portion of the side face 58b of the backlight device 50b overlaps the frame region 30a of the liquid crystal display panel 10a. With this construction, the display region 31b of the liquid crystal display panel 10b is brought closer to the display region 31a of the liquid crystal display panel 10a than in the case where the side face 58b is not oblique, whereby the volume of the light guide element can be reduced, thus being more effective for cost reduction. Note that the effects of the present invention can be sufficiently attained even if the side face of the backlight device is not formed oblique in this manner.

Moreover, in the case where display panels not having backlight devices are used as the display panels, a portion of a side face of a display panel may be obliquely beveled in the manner of the side face 58b of the backlight device 50b in order to bring the display regions of the display panels closer, thereby obtaining similar effects.

Next, a construction for attaining uniform displaying will be described. First, uniformization of luminance will be described.

Among the images formed on the liquid crystal display panels 10a and 10b, the images which are formed in the peripheral display regions 32a and 32b, where the light guide elements 20a and 20b are disposed, go through the light guide elements 22a and 22b before being displayed on the viewer's side. On the other hand, the images which are formed in the central display regions 33a and 33b, which are regions of the display regions 31a and 31b other than the peripheral display regions 32a and 32b, are displayed on the viewer's side without going through the light guide elements. Therefore, there will be a difference in luminance between the images which are formed in the peripheral display regions 32a and 32b and displayed through the light guide elements and the images which are formed in the central display regions 33a and 33b and displayed on the viewer's side. For example, in the case where the cross-sectional length L1 of the incident face 21a of the light guide element 20a is greater than the cross-sectional length L2 of the outgoing face 22a, an image which is formed in the peripheral display region 32a will be reduced through the light guide element 20a. This increases the luminance. On the other hand, in the case where L1<L2, an image which is formed in the peripheral display region 32a will be enlarged through the light guide element 20a. This decreases the luminance. The cases where L3>L4 and L3<L4 are respectively similar to the cases where L1>L2 and L1<L2. Moreover, the luminance is decreased due to the aperture ratios of the light guide elements 20a and 20b (i.e., in the case where the light guide elements 20a and 20b are optical fiber face plates, the aperture ratio NA of the optical fibers) and transmission loss. This occurs irrespectively of the relative sizes of L1, L2 and L3, L4. This is another reason why a difference in luminance will occur between the regions where the light guide elements 20a and 20b are provided and the regions where the light guide elements are not provided.

Such a difference in luminance can be alleviated by allowing the luminance of the images formed in the peripheral display regions 32a and 32b to differ from the luminance of the images formed in the central display regions 33a and 33b.

For example, in the case where the luminance of the images which are displayed in the regions where the light guide elements 20a and 20b are provided is lower than the luminance of the images which are displayed in the regions where the light guide elements 20a and 20b are not provided (i.e., the cases where L1<L2 and L<L4 based on the above description), an improvement can be attained by allowing the luminance of the images formed in the peripheral display regions 32a and 32b to be higher than the luminance of the images which are formed in the central display regions 33a and 33b.

In the liquid crystal display device 100 of the present embodiment, the following two methods can be adopted:

Method a: Decrease the transmittance of the pixels which are provided in the central display regions 33a and 33b.

Method b: Increase the intensity of light which is emitted toward the peripheral display regions 32a and 32b, so as to be greater than the intensity of the light emitted toward the central display regions 33a and 33b.

Method a can be easily realized by adjusting the voltages supplied to the pixels. Method b can be realized by ensuring that the intensity of the light which is emitted from the backlight devices 50a and 50b toward the pixels arrayed in the peripheral display regions 32a and 32b is greater than the intensity of the light which is emitted toward the pixels arrayed in the central display regions 33a and 33b, for example. In the case where cold-cathode tubes are arranged as the backlight devices 50a and 50b, the cold-cathode tubes disposed corresponding to the peripheral display regions 32a and 32b may be lit brighter than the other cold-cathode tubes (the cold-cathode tubes disposed corresponding to the central display regions 33a and 33b). Moreover, a similar method is also applicable to the case where light-emitting diodes (LEDs) are arrayed as the backlight devices 50a and 50b. It will be appreciated that Methods a and b may be combined for uniformization of luminance.

In the case where the display panel is a self-light-emitting type display panel such as a plasma display panel (PDP) or an organic EL display panel (OLED), the luminance of pixels provided in the display region where the light guide elements are not disposed may be made relatively small.

In the case where the transmittance of the light guide element may vary depending on the wavelength of the light entering the light guide element, i.e., the transmitted light may change in color, adjustment of coloration is possible by using Method a or Method b above.

Next, image uniformization will be described.

Figure 9:
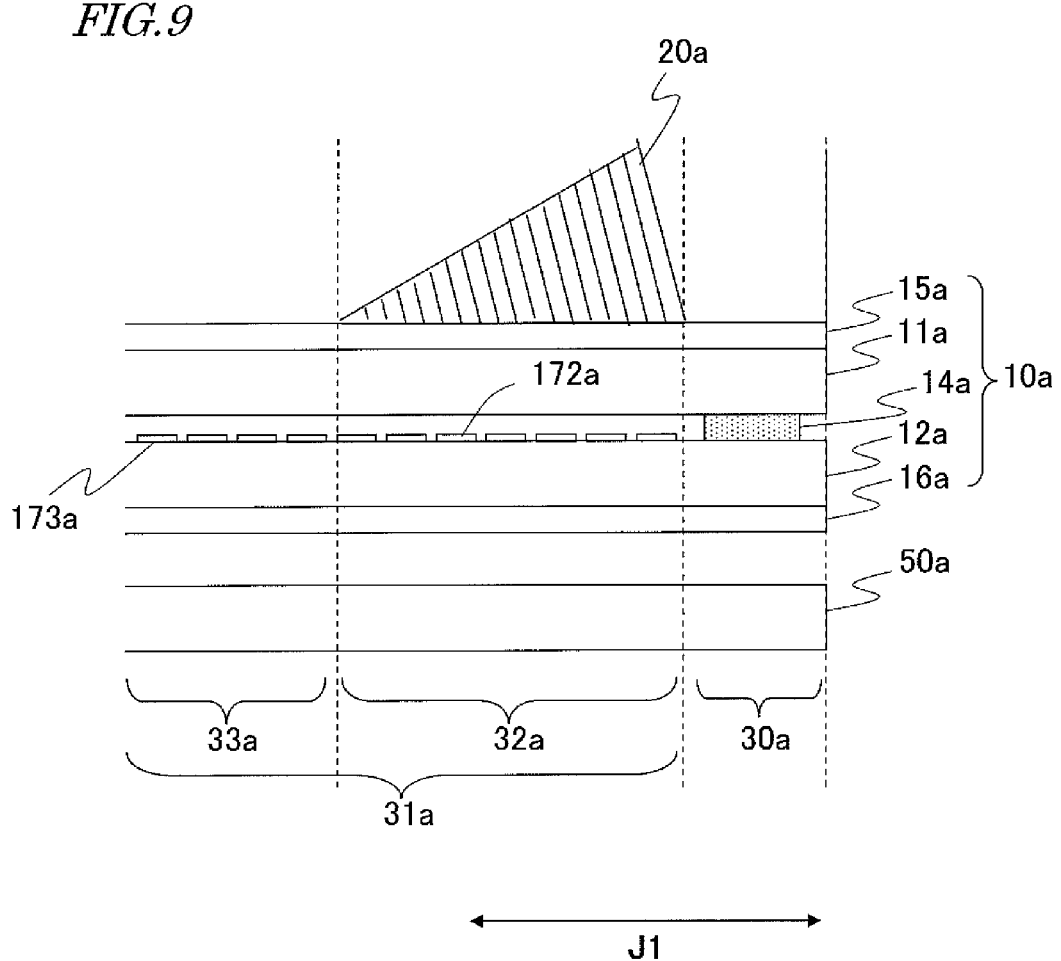
FIG. 9 A schematic diagram for describing a method (Method 1) of displaying an image in a compressed form.
Figure 10:
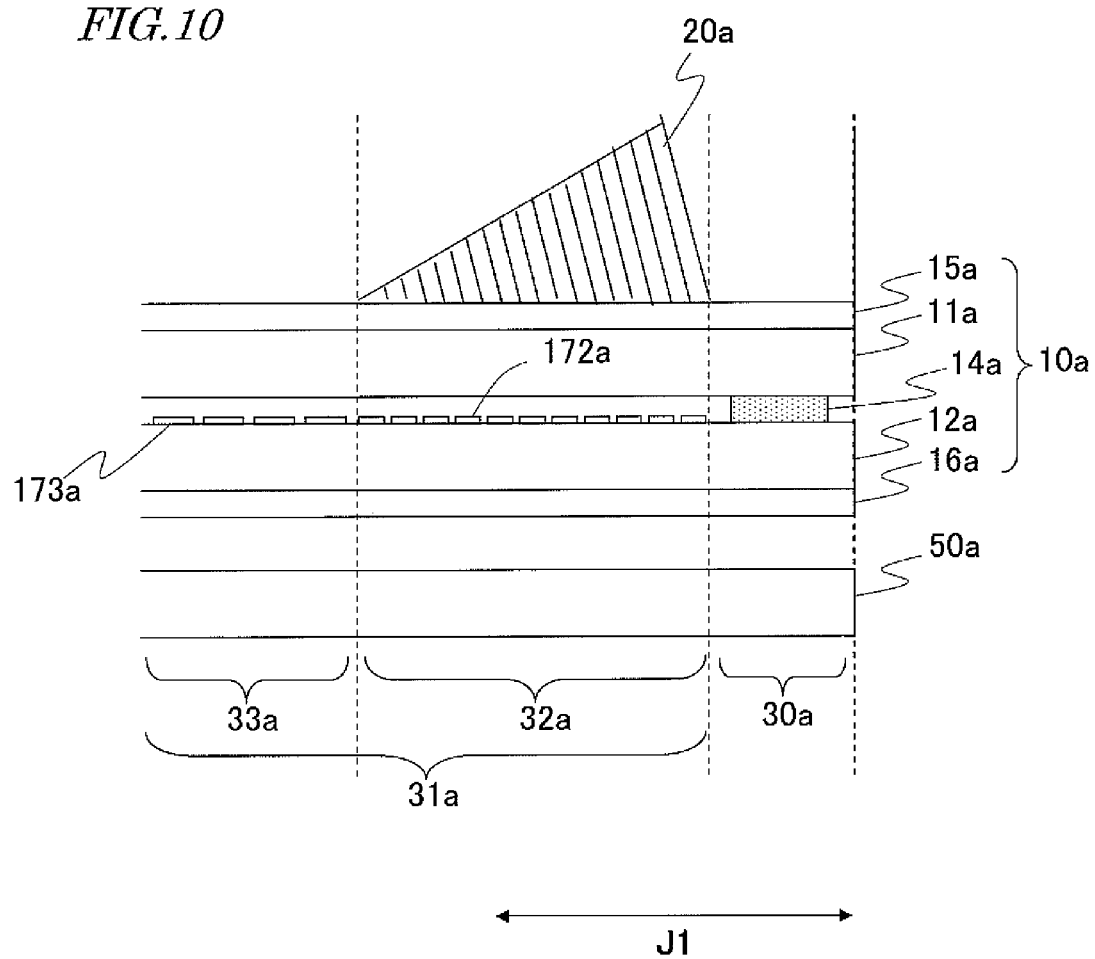
FIG. 10 A schematic diagram for describing a method (Method 2) of displaying an image in a compressed form.

As described above, in the case where L1<L2 in the light guide element 20a, an image which is formed in the peripheral display region 32a is enlarged by the light guide element 20a along the first axis J1. Therefore, in order to realize proper displaying, it is preferable the image which is formed in the peripheral display region 32a is subjected to a previous compression relative to the images which are formed in the central display regions 33a and 33b, in accordance with a ratio of enlargement by the light guide element 20a. There are following two methods of displaying an image in a compressed form. The two methods will be described with reference to FIGS. 9 and 10. FIG. 9 and FIG. 10 are schematic diagrams for explaining Methods 1 and 2 below, respectively.

Method 1: As in a liquid crystal display panel 10a shown in FIG. 9, a method of forming a compressed image in the peripheral display region 32a through signal processing, while the pitch of pixels 173a (pixels provided in the central display region 33a) and pixels 172a (pixels provided in the peripheral display region 32a) is kept constant across the entire display region 31a of the liquid crystal display panel 10a (peripheral display region 32a, central display region 33a). In other words, the display signals to be supplied to the plurality of pixels provided in the peripheral display region 32a are compressed along the first axis J1. At this time, the display signals to be supplied to the pixels 172a provided in the peripheral display region 32a are compressed in accordance with the rate of enlargement by the light guide element 20a.

Method 2: A method of, as in a liquid crystal display panel 10a shown in FIG. 10, making the pitch of the pixels 172a arrayed in the peripheral display region 32a narrower (compressed) than the pitch of the pixels 173a arrayed in the other region (central display region 33a), thus forming a compressed image without performing signal processing. Although Method 2 does not require any special signal processing, it is necessary to previously fabricate specially-designed display panels, thus resulting in problems such as poor versatility and cost.

On the other hand, Method 1 has an advantage in that commonly-used display panels can be used, although it requires signal processing. Method 1 can be implemented in software, for example. Moreover, in the case where the outgoing face 22a of the light guide element 20a is a plane (its cross section is a straight line), the image will be uniformly enlarged along the first axis, so that the image compression and display signal compression can be performed uniformly, thus providing an advantage in that signal processing can be simplified. As in the light guide elements 220a and 220b of the display device 200 shown in FIG. 8, in the case of using a light guide element whose outgoing face is a curved surface, an image may be compressed according to the rate of enlargement by the light guide element.

Thus, with respect to the case where L1<L2 so that an image to be formed in the peripheral display region 32a is enlarged by the light guide element 20a, a method of forming an image in the peripheral display region 32a in a more compressed form than in the central display region 33a has been described. In the case where L1>L2, an image formed in the peripheral display region 32a will be reduced by the light guide element 20a along the first axis J1, so that it is preferable that an image to be formed in the peripheral display region 32a is subjected to a previous enlargement relative to an image to be formed in the central display region 33a. A method of forming an enlarged image can be realized as a reversed method of that of the aforementioned reducing case.

As for the light guide element 20b, too, an image to be formed in the peripheral display region 32b may be reduced or enlarged along the second axis J2 by the above-described methods in the cases where L3<L4 and L3>L4, respectively.

In the liquid crystal display device 100 of the present embodiment, the shapes of the light guide elements 20a and 20b are isosceles triangular prisms. That is, cross sections of the light guide elements 20a and 20b that are perpendicular to their longitudinal directions are isosceles triangles, such that L1=L2, L3=L4. Therefore, images formed in the peripheral display regions 32a and 32b are neither enlarged nor reduced by the light guide elements 20a and 20b. Thus, there is no need for the above-described image enlargement or reduction. However, in the case where there is a conspicuous difference in luminance due to transmission losses of the light guide elements, it is preferable to alleviate the difference in luminance by the aforementioned methods as necessary. Moreover, due to the different sizes of the light guide elements 20a and 20b, a difference in luminance may occur between an image displayed on the outgoing face 22a and an image displayed on the outgoing face 22b. In that case, too, it is preferable to alleviate the difference in luminance by the aforementioned methods as necessary.

Figure 11:
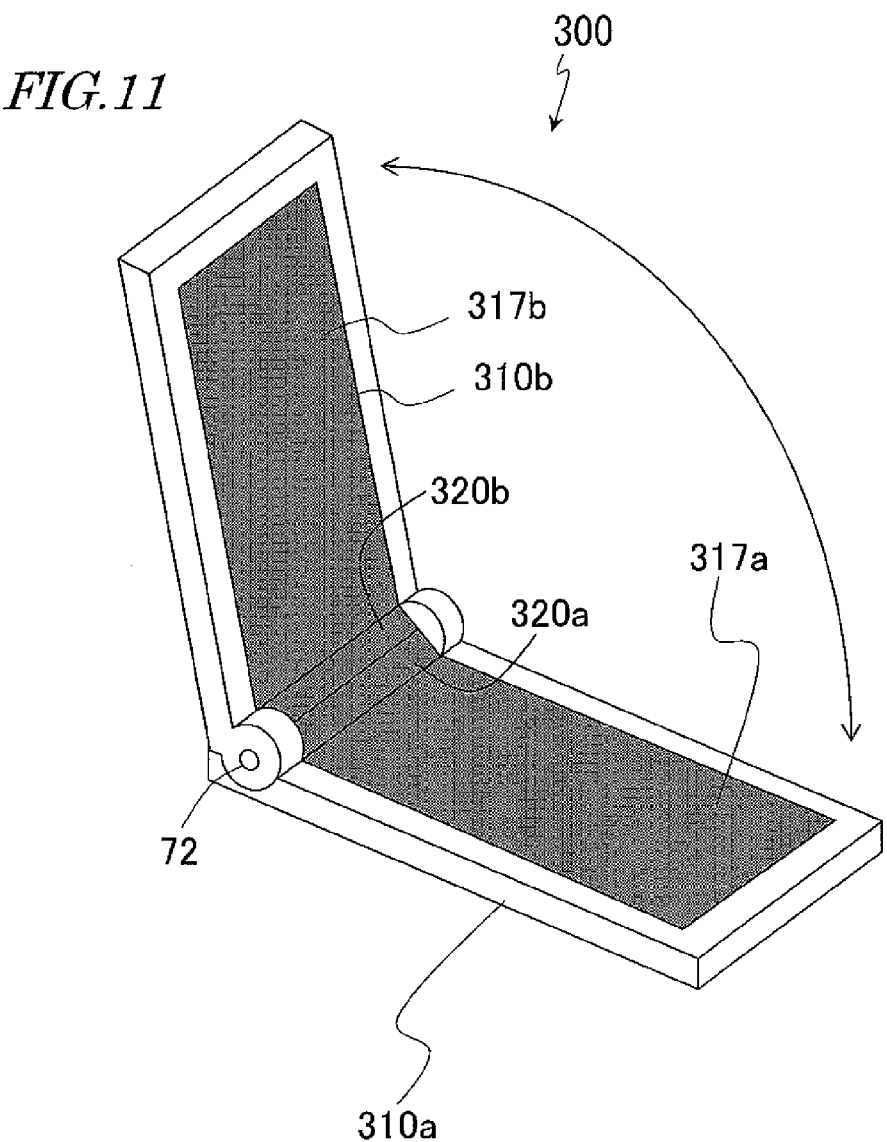
FIG. 11 A schematic perspective view of another display device 300 according to an embodiment of the present invention.

The construction of the liquid crystal display device 100 of the present embodiment is applicable to a display device in which a plurality of display panels are disposed at a predetermined angle, but is also applicable to a display device in which the angle between display panels is variable. A display device 300 shown in FIG. 11 has a movable section capable of rotation around an axis 72, which is a point of contact between light guide elements 320a and 320b provided on display panels 310a and 310b of adjoining viewer-side surfaces 317a and 317b. Details of the movable section are shown in FIG. 12. FIG. 12 is an enlarged cross-sectional view of the movable section, where FIG. 12(a) shows an open state and FIG. 12(b) shows a closed state. By adopting such a construction, the angle between the adjoining display panels 310a and 310b may be made variable. Moreover, it can be opened or closed while keeping the joint between the display panels obscured. In the display device 300 as such, too, use of small-sized light guide elements will allow the joint to be obscured at low cost.

Therefore, the present invention may also be applied to a display device having two screens, such as a mobile phone, a game machine, or an electronic book, whereby a jointless image can be displayed at low cost. Thus, according to the present invention, a display device with a screen which is larger than conventional can be mounted in a small-sized electronic device.

Figure 13:
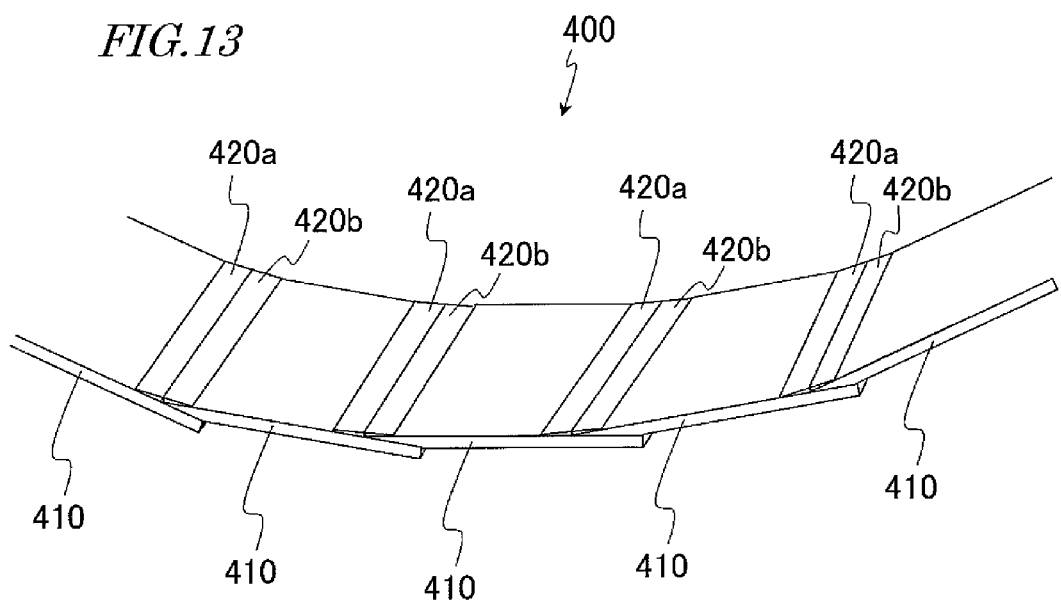
FIG. 13 A schematic perspective view of another display device 400 according to an embodiment of the present invention.

Although the liquid crystal display device 100 of the present embodiment includes two display panels, the liquid crystal display device 100 of the present embodiment may be applied to the case of using more display panels for tiling, as in a display device 400 shown in FIG. 13. FIG. 13 shows a perspective view of a display device 400 having a plurality of display panels. The display device 400 shown in FIG. 13 includes a plurality of display panels 410, such that the display panel 410 adjoin one another. The frame region of one display panel is overlapped by a side face of another display panel, such that an angle between the viewer-side surface of one of every two adjoining display panels and the viewer-side surface of the other display panel is less than 180° (e.g., 10°). In the display device 400, too, by providing light guide elements 420a and 420b at the mutually-adjoining ends of the display panels, a curved-surface type display device which displays an image with obscured joints is realized. In such a display device, too, a jointless image can be displayed by small-sized light guide elements, whereby the cost of the light guide elements is reduced.

Figure 14:
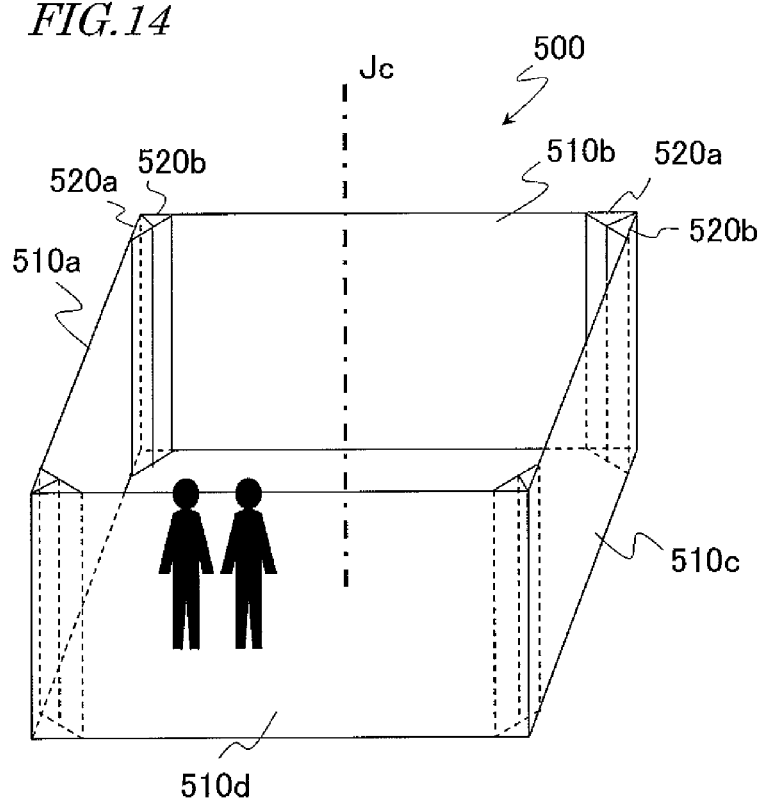
FIG. 14 A schematic perspective view of another display device 500 according to an embodiment of the present invention.

Moreover, by disposing at least three display panels in an annular shape around one axis, a display device whose entire inner surface serves as a display plane can be realized. For example, in a display device 500 shown in FIG. 14, four display panels 510a, 510b, 510c, and 510d are disposed in an annular shape around a center axis Jc, with light guide elements 520a and 520b being disposed at corners of the display device. Such a display device can also display a jointless image with small-sized light guide elements, whereby cost reduction is realized.

In an application of the display device 500, display panels may be disposed along the inner walls of a room, with light guide elements being provided corresponding to the corners, whereby the entire inner walls of the room can be covered with a jointless display device. By covering the entire inner walls with a jointless display device, a super high presence can be realized beyond what is possible with a single display panel.

As described above, according to the present invention, by providing light guide elements in a display device having a plurality of display panels, the joint(s) between display panels can be obscured more easily and at lower cost than conventionally. In particular, in a display device in which a plurality of display panels are disposed so as to adjoin at a predetermined angle, the light guide elements can be made small, thus further reducing the cost.

INDUSTRIAL APPLICABILITY

The present invention is suitably used for various direct-viewing type display devices.

REFERENCE SIGNS LIST 10a, 10b liquid crystal display panel
11a, 11b, 12a, 12b substrate
13a, 13b liquid crystal layer
14a, 14b sealing portion
15a, 15b, 16a, 16b optical film portion
17a, 17b viewer-side surface of liquid crystal display panel
18b side face of liquid crystal display panel
20a, 20b light guide element
21a, 21b incident face
22a, 22b outgoing face
23a, 23b side face
24a, 24b end of outgoing face
30a, 30b frame region
31a, 31b display region
32a, 32b peripheral display region
33a, 33b central display region
35a boundary between frame region and peripheral display region
40 sheet laminate
43 base
44 low-refractive index resin layer
45 laminate
50a, 50b backlight device
58b side face of backlight device
61, 62 cut surface
100 liquid crystal display device
J1 first axis
J2 second axis
L1, L3 length of incident face on a cross section
L2, L4 length of outgoing face on a cross section
α, β vertex angle of triangular prism
θ angle between display panels

The invention claimed is:

1. A direct-viewing type display device comprising a plurality of display panels, having a display region and a frame region outside the display region, wherein,
the plurality of display panels include first and second display panels adjoining each other;
the frame region of the first display panel is overlapped by a side face of the second display panel, such that a viewer-side surface of the first display panel and a viewer-side surface of the second display panel constitute an angle of more than 0° and less than 180°;
first and second light guide elements are disposed on a viewer's side of peripheral display regions adjoining the frame regions of the first and second display panels, respectively;
the first and second light guide elements have an incident face, an outgoing face, and a plurality of light guide paths formed between the incident face and the outgoing face;
a distance between the incident face and the outgoing face of the first and second light guide elements increases away from the peripheral display region and toward the frame region; and
a volume of the first light guide element is greater than a volume of the second light guide element.

2. The display device of claim 1, wherein an end of the outgoing face of the first light guide element closer to the second display panel abuts an end of the outgoing face of the second light guide element closer to the first display panel.

3. The display device of claim 1, wherein the outgoing face of the first light guide element is parallel to the outgoing face of the second light guide element.

4. The display device of claim 1, wherein shapes of the first and second light guide elements are triangular prisms.

5. The display device of claim 4, wherein shapes of the first and second light guide elements are isosceles triangular prisms.

6. The display device of claim 5, wherein,
- the angle between the viewer-side surface of the first display panel and the viewer-side surface of the second display panel is θ; and
- shapes of the first and second light guide elements are isosceles triangular prisms with vertex angles of θ/2.

7. The display device of claim 1, wherein shapes of the outgoing faces of the first and second light guide elements are cylindrical surfaces.

8. The display device of claim 1, wherein a plurality of optical fibers are arrayed, in parallel, in at least one of the first and second light guide elements.

9. The display device of claim 1, wherein a plurality of light guide layers are arrayed, in parallel, in at least one of the first and second light guide elements.

10. The display device of claim 1, further comprising a backlight device on an opposite side of the second display panel from the viewer-side surface, wherein
- a side face of the backlight device closer to the first display panel is parallel to the viewer-side surface of the first display panel and overlaps the frame region of the first display panel.

11. The display device of claim 1, wherein a light-diffusing layer is provided on the outgoing face of the first light guide element or the outgoing face of the second light guide element.

12. The display device of claim 1, wherein,
- the plurality of display panels include at least three display panels; and
- the at least three display panels are disposed in an annular shape.

* * * * *